(12) United States Patent
Brenner

(10) Patent No.: US 7,350,719 B1
(45) Date of Patent: Apr. 1, 2008

(54) VEHICLE TRACTION DEVICE

(76) Inventor: Eugene Brenner, 11705 Quiggle Rd., Herald, CA (US) 95638

(*) Notice: Subject to any disclaimer, the term of this patent is extended or adjusted under 35 U.S.C. 154(b) by 263 days.

(21) Appl. No.: 11/212,544

(22) Filed: Aug. 26, 2005

(51) Int. Cl.
*E01B 23/00* (2006.01)

(52) U.S. Cl. ...................................................... 238/14

(58) Field of Classification Search ................. 238/14; D12/608
See application file for complete search history.

(56) References Cited

U.S. PATENT DOCUMENTS

| | | | |
|---|---|---|---|
| 1,375,666 A | 4/1921 | Bauer | |
| 1,400,478 A * | 12/1921 | Deschamps | 238/14 |
| 2,479,760 A * | 8/1949 | Merrick | 238/14 |
| 3,701,474 A | 10/1972 | Welz | |
| 3,752,396 A * | 8/1973 | Bustin | 238/14 |
| D255,791 S * | 7/1980 | LaPointe | D12/608 |
| 4,300,722 A * | 11/1981 | Simmons | 238/14 |
| 4,568,020 A | 2/1986 | Gallichan | |
| 6,725,894 B2 * | 4/2004 | Clark | 152/217 |

* cited by examiner

*Primary Examiner*—Mark Le
(74) *Attorney, Agent, or Firm*—John P. Costello

(57) ABSTRACT

An inventive traction device is provided for extricating mired vehicles from mud, snow or sand. The device is comprised of modules linked together to create a track upon which a mired vehicle drives over. The individual modules each have four walls forming a trough and a number of tire supports which rise up from the floor of the trough. The trough-like construction of the device helps prevent the device from becoming overloaded with mud deposited from mired vehicle tires.

6 Claims, 3 Drawing Sheets

VEHICLE TRACTION DEVICE

TECHNICAL FIELD

This invention relates to devices for removing a mired vehicle from mud holes, sand traps and snow banks, and more specifically, relates to a vehicle removal device which resists becoming overloaded with mud, sand or snow.

BACKGROUND

Traction devices for extricating a vehicle from mud holes, sand traps and snow banks are wide and varied. Many of these devices involve placing some sort of flat traction surface beneath the wheel of a vehicle, wherein the stuck vehicle climbs up on the traction surface, thereby extricating the vehicle from its predicament. A problem can arise when the traction surface becomes overloaded with mud, especially mud having a high clay content, which tends to fill up and stick to a traction surface. Once filled, a traction surface loaded with high-clay mud can become as slick as the mud surface itself, rendering the traction surface useless.

Therefore, a need exists for a traction device which resists becoming overloaded with mud, snow, or other slippery surface material. Further, a need exists for a traction device which is resistant to becoming overloaded with persistent sticky surface materials, such as high clay mud. Should such a device become overloaded, it should be able to be easily cleared of persistent surface materials and be easily put back into service. Also, preferably, this device would be easily portable and be able to be compactly loaded and stored in a vehicle until such time that it is needed.

The foregoing reflects the state of the art of which the inventor is aware, and is tendered with a view toward discharging the inventor's acknowledged duty of candor, which may be pertinent to the patentability of the present invention. It is respectfully stipulated, however, that the foregoing discussion does not teach or render obvious, singly or when considered in combination, the inventor's claimed invention.

SUMMARY OF THE INVENTION

The inventive vehicle traction device is resistant to becoming overloaded with slippery surface materials, such as mud or snow, and especially performs well when a vehicle is mired in mud having a high clay content. The device is made from rigid materials and is modular in its design wherein at least two modules placed under a drive wheel are required to create an operational device. It is best if at least two modules are placed under each wheel of the drive axle to take advantage of the power transferring properties of the drive axle. The first module is of a low profile design which inserts under a drive wheel of a vehicle that is mired in mud, snow or sand. The second module is flexibly linked to the first module, the second module having deep anchoring fins which anchor the device in soft soil or sand.

Each module incorporates a four-sided trough with a bottom surface, wherein at least one of the latitudinal sides is imparted with ridges along its top to create a traction surface. A latitudinal wall having ridges is placed perpendicularly within the trough, to add another traction surface for helping a vehicle wheel along, as it travels over the device. The latitudinal wall divides the trough into separate trough spaces. In each trough space, one or more tire supports extend upward from the bottom surface. The trough spaces are wide and deep enough to allow a mudded tire to travel over the device several times, before the trough spaces become overloaded with mud. Should the trough become filled with mud, the ridged tops of the latitudinal wall and sides extend slightly above the longitudinal walls, so that they will always extend above the level of mud present in the trough below. Should the troughs become overloaded with mud, the user merely has to tap the underside of device with a hammer to clear the device, thereby readying it for use again.

Accordingly, the following objects and advantages of the invention apply:

It is an object of this invention to provide a vehicle traction device which resists becoming overloaded with slippery surface materials, especially mud having a high clay content.

It is another object of this invention to provide a vehicle traction device which can be stacked in a compact fashion so that it can be stored easily within a vehicle.

Further objects and advantages of the invention will be brought out in the following portions of the specification, wherein the detailed description is for the purpose of fully disclosing preferred embodiments of the invention, without placing limitations thereon.

BRIEF DESCRIPTION OF THE DRAWINGS

The invention will be more fully understood by reference to the following drawings which are for illustrative purposes only.

DETAILED DESCRIPTION OF THE PREFERRED EMBODIMENTS

Figure 1:
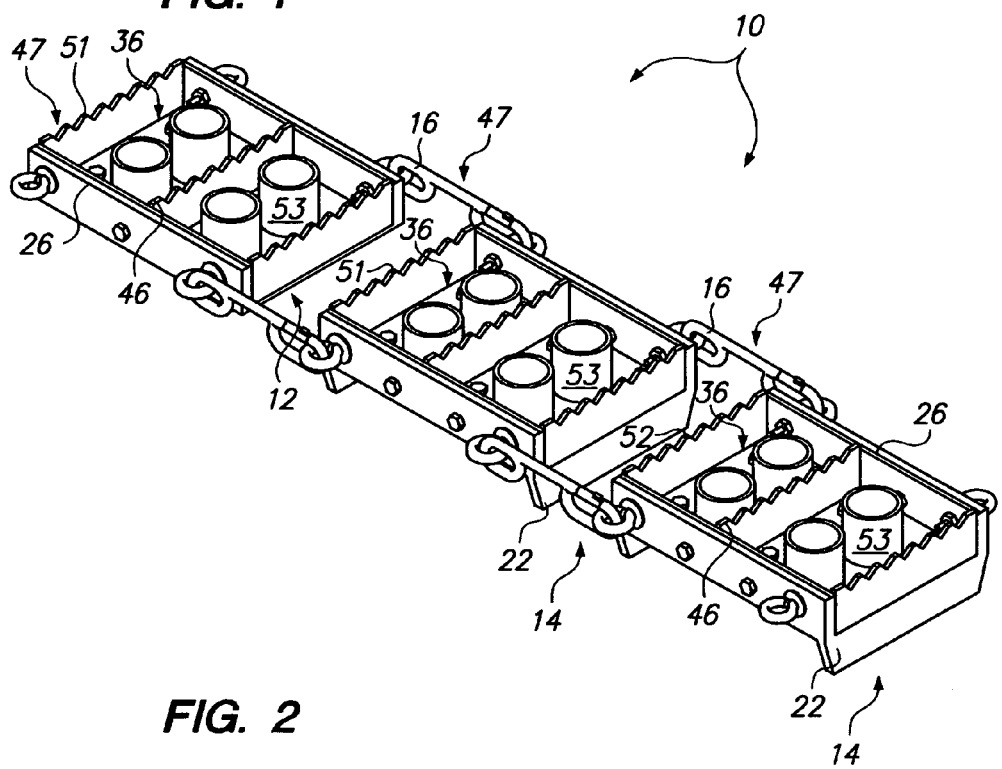
FIG. 1 is an elevated perspective view of the device shown as three linked modules, wherein one module is low profile and the other modules are high profile.
Figure 2:
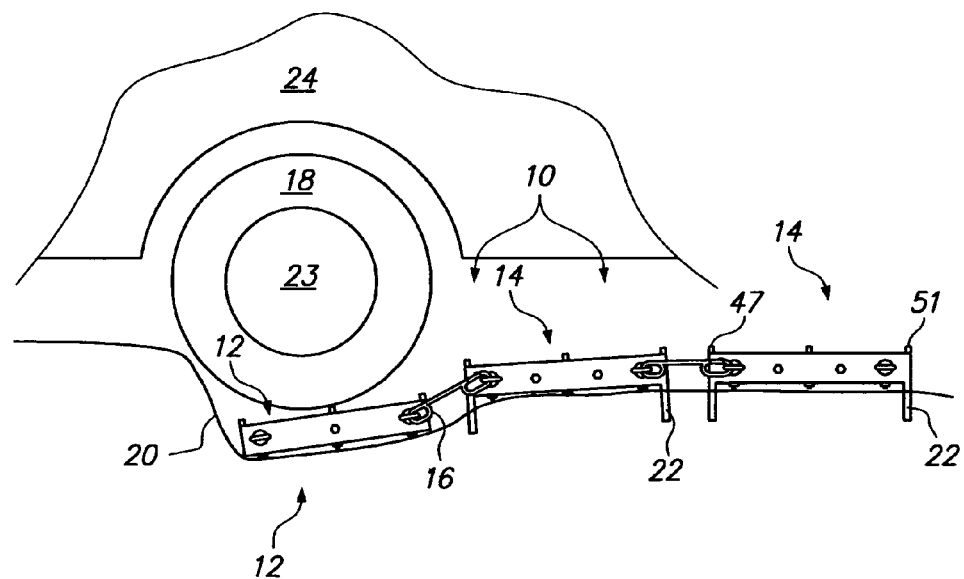
FIG. 2 is a side view of a mired vehicle drive wheel showing the device comprised of three linked modules, similar to FIG. 1, wherein the low profile module is inserted beneath the tire of the mired drive wheel.

Referring to FIG. 1 the preferred embodiment of the inventive traction device 10 is shown. The device 10 is comprised of a plurality of modules 12, 14, which can be linked together indefinitely by a flexible link, such as a chain or releasable snap link 16. Preferred materials for constructing the device 10 are rigid materials such as aluminum, other metals or lightweight carbon fiber composites. The minimum number of required modules 12, 14 is two, to create an operative device 10, namely a low-profile module 12 which is inserted beneath the tire of a mired vehicle drive wheel, and a second high-profile module 14, which is anchored deeply into the soft surface material (e.g. mud, sand, or snow) to prevent the device 10 from being thrown out from beneath the spinning tire. FIG. 2. shows the device 10 represented as three modules 12, 14 in a typical configuration for extricating a vehicle's mired tire 18. The low profile module 12 fits within the mud hole 20 and beneath the tire 18 of the mired drive wheel 23. The high profile modules 14 are anchored into the soil through the benefit of deep anchoring fins 22, which protrude perpendicularly downward from beneath the module 14 at each opposite end. The deep anchoring fins 22 preferably range from 1"-2" in depth, and prevent the device 10 from being thrown out from beneath the drive wheel 23 of a vehicle 24. Deep anchoring fins 22 are also preferably tapered along their lateral sides 26 (see also FIGS. 5A and 5B), so that the bottom end 28 is narrower than the top 30. This tapered shape facilitates insertion of the fins 22 into soft surface materials. The low profile module 12 may have its underside 32 endowed with low profile anchoring pegs 34 (see also FIG. 6), but the deep anchoring fins 22 are absent. The high profile module 14 may also possess anchoring pegs 34 on its underside 32 in addition to having deep anchoring fins 22.

Figure 3:
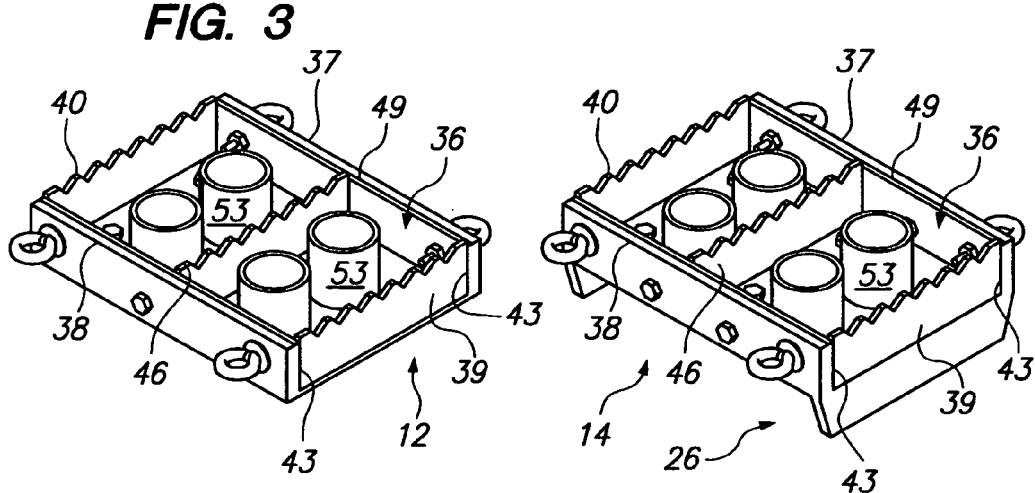
FIG. 3 is an elevated perspective view of two modules, a low profile module and a high profile module.
Figure 4:
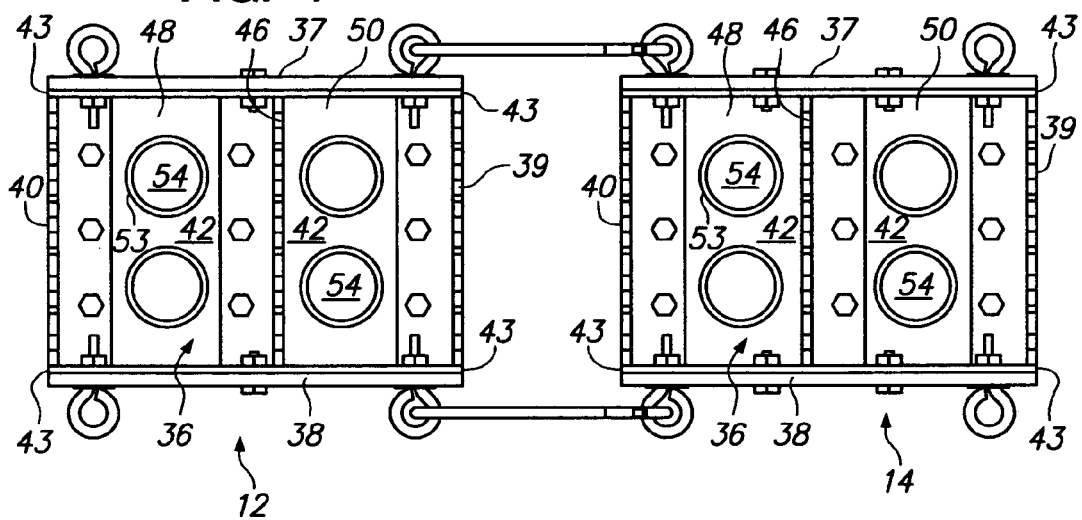
FIG. 4 is a plan view of the modules of FIG. 3, shown linked with snap links.

FIGS. 3 and 4 show the trough 36 of the high and low profile modules 12, 14. Troughs 36 are four-sided with left 37 and right 38 longitudinal sides and front 39 and rear 40 latitudinal sides. A bottom surface 42 adjoins the four sides 37,38,39,40 and the depth of the trough 36 from the bottom surface 42 to the top 49 of the longitudinal sides 37, 38 is from ½' to 1" deep. A gap 43 preferably remains at the corner junction 44 (see also FIGS. 5A and 5B) of latitudinal and longitudinal sides, to provide drainage to trough 36 from wet materials or snow. Gaps 43 also provide relief points for allowing sand or mud to travel out of the trough 36 upon facing downward pressure from a tire 18, which further aids in preventing the trough 36 from becoming overloaded with soft surface material. Within trough 36 is a wall 46 that is latitudinally disposed between longitudinal sides 37, 38, this latitudinal wall 46 arising perpendicularly from the bottom surface 42 and dividing the trough 36 into trough spaces 48, 50. The top 47 of wall 46 as well as the top 47 of front and rear sides 39, 40 are preferably formed into ridges 51 to create a traction surface.

Figure 5A:
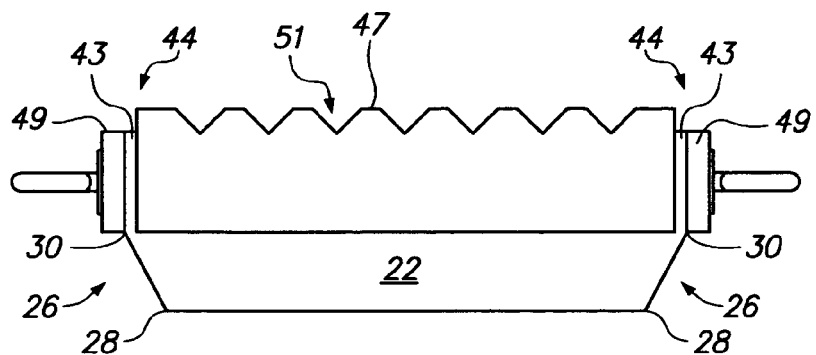
FIG. 5A is a front view of the high profile module.
Figure 5B:
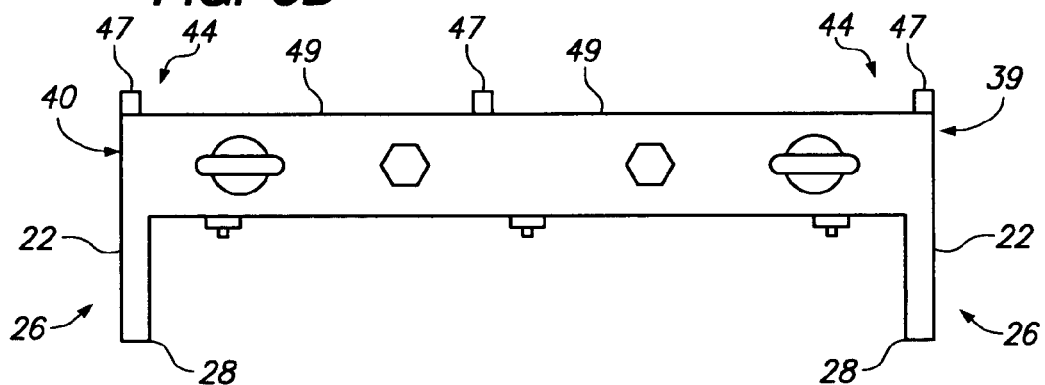
FIG. 5B is a side view of the high profile module.

Furthermore, as shown in FIGS. 5A and 5B the top 47 of latitudinal wall 46, as well as the top 47 of front and rear sides 39, 40 protrude slightly above longitudinal sides. It has been found that the depth of the troughs 36 allow significant capacity for receiving surface materials, such as mud, snow or sand, which fall from a vehicle's tire 18 as it rides over the device 10. It has been found that a mud-caked tire 18 must pass over the device 10 several times in order to overload trough. This capability can be very useful when a vehicle becomes stuck multiple times, or when more than one vehicle is mired and the device must be used more than once. Furthermore, the extended tops 47 of wall 46 and front and rear sides 39, 40 have a tendency to avoid overloading, as should the trough 36 fill up, the weight of the vehicle 24 pushing downward on the compacted material in the trough 36 tends to force it sideways, over the tops 48 of longitudinal sides 37, 38, and through gaps 43, thus providing the material an escape route, which avoids overloading the extended tops 47 of latitudinal wall 46 and front and rear sides 39, 40.

Figure 6:
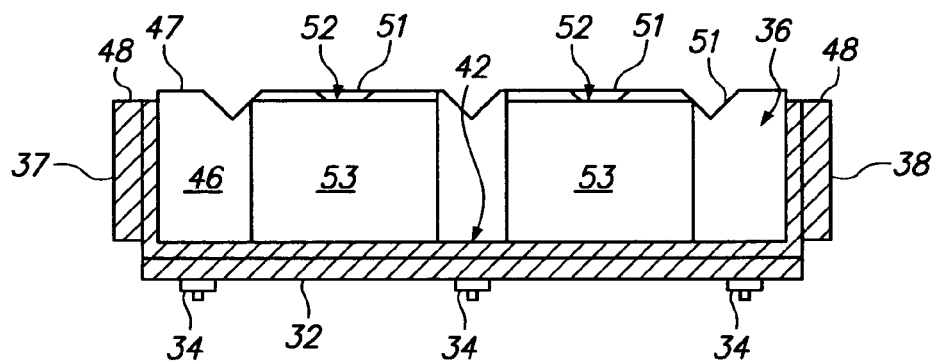
FIG. 6 is a front cutaway view of the low profile module showing the tire supports located within the trough of the module.

Referring now to FIG. 6, the tire supports 53 can be seen. Tire supports 53 are coupled to bottom surface 42 and arise upwardly there from and their tops 52 are approximately even in height with the longitudinal sides 37, 38. Tire supports 53 as shown, are cylindrical pipe sections within trough spaces, which help keep the tire 18 of a vehicle 24 supported as it travels over the device 10. Tire supports 53 preferably have an open top 52 and have a hollow interior 54 so as to retain capacity for receiving material from a tire 18, and thereby resist becoming overloaded.

Figure 7:
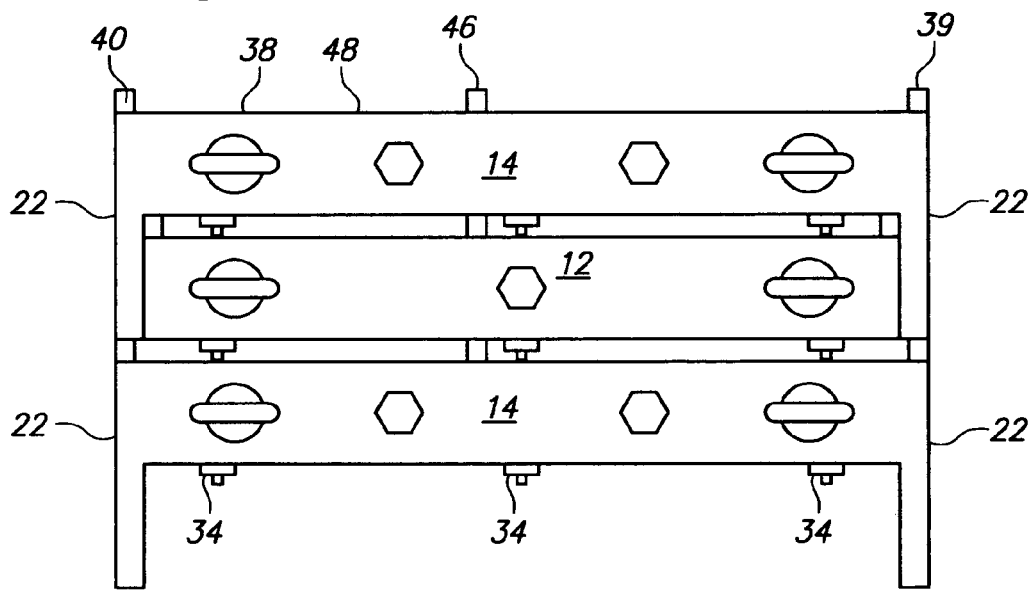
FIG. 7 shows three modules comprising the device arranged in a stacked configuration for easy storage and transport.

FIG. 7 shows the device 10 in a stacked configuration for easy storage and transport. Upon stacking the modules 12, 14 of the device 10 it can be held together with a bungee cord or clamp.

The inventive vehicle traction device 10 can be used with any vehicle requiring traction for ready removal from a mired situation. Its rugged construction and resistance to overloading renders it a reliable solution for farmers, 4-wheelers and anyone else who is posed with solving the problem of a mired vehicle.

Finally, although the description above contains many specificities, these should not be construed as limiting the scope of the invention but as merely providing illustrations of some of the presently preferred embodiments of this invention. This invention may be altered and rearranged in numerous ways by one skilled in the art without departing from the coverage of any patent claims which are supported by this specification.

The invention claimed is:

1. A device made from a rigid material for placing beneath the tire of a motor vehicle, comprising at least a first module and a second module, said first and second modules each further comprising a trough, said trough having front, center and rear latitudinal walls disposed between left and right longitudinal sides, said trough having a bottom surface adjoining said walls and sides, said walls further comprising a plurality of ridges imparted across their top, said ridges being elevated above said longitudinal sides, said device further comprising a plurality of tire supports fixed to said bottom surface and extending upward within said trough, wherein one of said modules further comprises a pair of latitudinally disposed anchoring fins extending perpendicularly downward from its bottom surface and a means for flexibly coupling said first module to said second module, and wherein said second of said modules is without latitudinally disposed anchoring fins, said second module adopting a lower profile than said first module.

2. The device as recited in claim 1, wherein said flexible coupling means comprise a snap link.

3. The device as recited in claim 1, further comprising gaps separating said longitudinal sides from said front and rear latitudinal walls.

4. The device as recited in claim 1, further comprising anchoring pegs extending downward from said bottom surface of said modules.

5. The device as recited in claim 1, wherein said anchoring fins are tapered in shape.

6. The device as recited in claim 1, wherein said tire supports have an open top and a hollow interior.

* * * * *